(12) United States Patent
Harley et al.

(10) Patent No.: US 7,158,115 B2
(45) Date of Patent: Jan. 2, 2007

(54) SPRING SYSTEM FOR RE-CENTERING A MOVABLE OBJECT

(75) Inventors: Jonah Harley, Mountain View, CA (US); Storrs Hoen, Brisbane, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 486 days.

(21) Appl. No.: 10/723,596

(22) Filed: Nov. 24, 2003

(65) Prior Publication Data

US 2005/0110747 A1    May 26, 2005

(51) Int. Cl.
*G09G 5/00* (2006.01)

(52) U.S. Cl. .................. 345/157; 345/163; 345/173

(58) Field of Classification Search ........ 345/156–158, 345/161–167, 169, 173; 178/18.03, 18.05; 463/37–38
See application file for complete search history.

(56) References Cited

U.S. PATENT DOCUMENTS

| | | | | |
|---|---|---|---|---|
| 4,670,743 A | * | 6/1987 | Zemke | 345/157 |
| 5,065,146 A | * | 11/1991 | Garrett | 345/161 |
| 5,086,296 A | * | 2/1992 | Clark | 345/157 |
| 5,252,952 A | | 10/1993 | Louis | |
| 5,504,502 A | * | 4/1996 | Arita et al. | 345/160 |
| 5,704,037 A | * | 12/1997 | Chen | 345/184 |
| 5,808,603 A | * | 9/1998 | Chen | 345/157 |
| 5,956,016 A | * | 9/1999 | Kuenzner et al. | 345/156 |
| 6,256,012 B1 | * | 7/2001 | Devolpi | 345/161 |
| 6,326,948 B1 | * | 12/2001 | Kobachi et al. | 345/157 |

FOREIGN PATENT DOCUMENTS

WO    WO 03/030092    4/2003

* cited by examiner

*Primary Examiner*—Lun-yi Lao

(57) ABSTRACT

A puck is movable within a puck field of motion defined by a boundary. Arcuate springs connect the puck to the boundary. Each arcuate spring has a first end connected to the puck and a second end connected to the boundary, and applies a force to the puck that maintains the puck in a predetermined region of the puck field of motion when no external force is applied to the puck. In an embodiment, each arcuate spring includes a planar spiral member. The arcuate springs can also apply a force that dampens any oscillations in the puck position when the puck returns to the predetermined region in the puck field of motion. The puck can also include an electrode that is electrically connected to a point outside the puck field of motion by one of the arcuate springs.

7 Claims, 3 Drawing Sheets

SPRING SYSTEM FOR RE-CENTERING A MOVABLE OBJECT

FIELD OF THE INVENTION

The present invention relates to mechanisms for re-centering a movable object within a two-dimensional field of motion when no external force is applied to the object.

BACKGROUND OF THE INVENTION

Consider an apparatus in which an object moves over a two-dimensional surface within a predetermined area in response to an external force applied to the object. The object will be referred to as a puck in the following discussion, and the area over which it is permitted to move will be referred to as the puck field of motion. For example, a computer pointing device that is analogous to a "mouse" is described in a co-pending patent application. This device includes a puck that moves over a surface within a puck field of motion in response to a user applying force to the puck via a finger. The surface has position sensors that sense the position of the puck within the puck field of motion and report that position to a data processing system coupled to the device. When the user releases the puck, the puck returns to a predetermined location within the puck field of motion. The restoring force for returning the puck is generated by springs that connect the puck to a support at the edge of the puck field of motion.

A similar mechanism can be utilized to construct an accelerometer. In this case, the puck moves when the device carrying the puck accelerates. The acceleration can be quantified by measuring the puck position as a function of time. Once the acceleration has ceased, the puck is returned to its starting position by the springs.

In the case of a mouse, the springs used to restore the puck position should provide a restoring force that recenters the puck without requiring that the user apply a force to move the puck that is large enough to cause the user's hand to become fatigued. In addition, the force the user applies to move the puck should not vary over the puck field of motion, since such variations can interfere with the precision with which the user can position the puck. In addition, embodiments that are designed for use in laptop and handheld computers place a premium on both the lateral size of the pointing device and the thickness of the pointing device. Hence, designs in which the springs increase the thickness or lateral dimensions of the pointing device are not preferred. In the case of an accelerometer or the like, the restoring force should be uniform independent of the direction in which the puck moves.

SUMMARY OF THE INVENTION

The present invention includes a moveable puck that moves within a puck field of motion. The puck field of motion is defined by a boundary. Arcuate springs connect the puck to the boundary. Each arcuate spring has a first end connected to the puck and a second end connected to the boundary, and applies a force to the puck that maintains the puck in a predetermined region of the puck field of motion when no external force is applied to the puck. Each arcuate spring includes a planar spiral member in one embodiment. In another embodiment, one of the arcuate springs also applies a force that dampens any oscillations in the puck position when the puck returns to the predetermined region in the puck field of motion. In another embodiment, the puck also includes an electrode that is electrically connected to a point outside the puck field of motion by one of the arcuate springs. In another embodiment, the boundary is defined by an opening in a layer of material. In another embodiment, the puck and the springs are constructed from a portion of the layer of material.

DETAILED DESCRIPTION OF PREFERRED EMBODIMENTS OF THE INVENTION

Figure 1A:
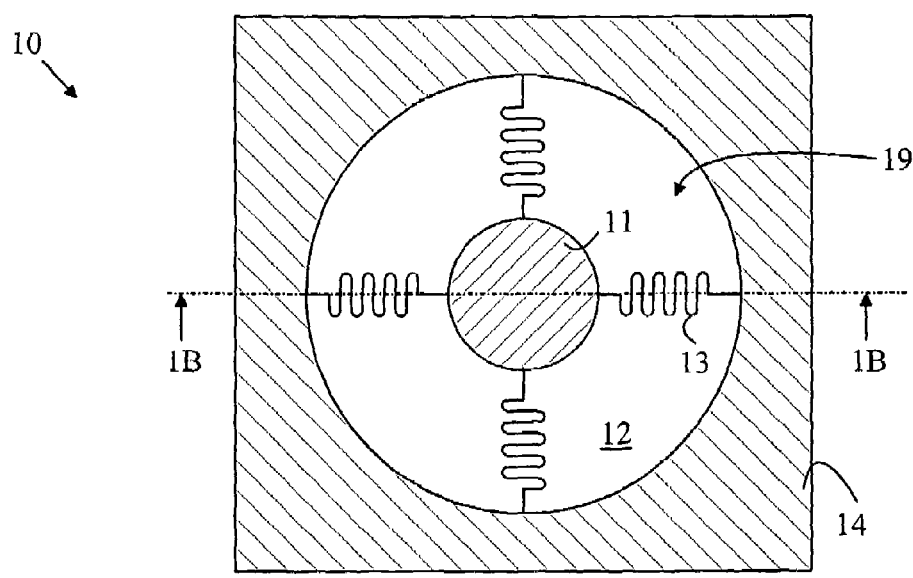
FIG. 1A is a top view of pointing device 10.
Figure 1B:
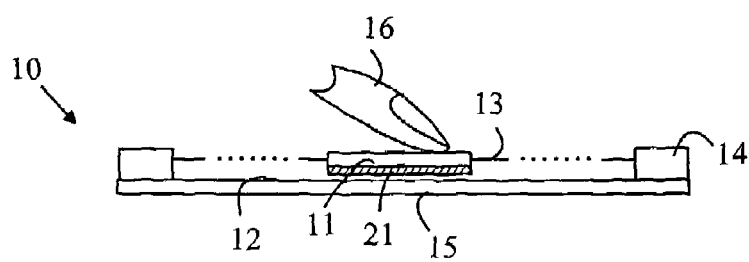
FIG. 1B is a cross-sectional view of pointing device 10 through line 1B—1B shown in FIG. 1A.

The manner in which the present invention provides its advantages can be more easily understood with reference to FIGS. 1A–1B, which illustrate a pointing device 10 that utilizes a puck of the type discussed above to implement a pointing device. FIG. 1A is a top view of pointing device 10 and FIG. 1B is a cross-sectional view of pointing device 10 through line 1B—1B shown in FIG. 1A. Pointing device 10 includes a puck 11 that moves over a surface 12 of a substrate 15 within a puck field of motion 19 in response to a lateral force being applied to puck 11. The force is typically applied to puck 11 by a user's finger, thumb or multiple fingers. In addition, pointing device 10 includes a sensing mechanism for determining the position of puck 11 on surface 12. When the user releases puck 11, the meander springs shown at 13 that connect puck 11 to the periphery 14 of the puck field of motion return the puck to a predetermined location in the puck field of motion.

The position of the puck in the puck field of motion may be determined by a number of different methods. Since the method of determining the puck position is not relevant to the present discussion, the various position sensing mechanisms will not be discussed in detail here. For the purposes of the present discussion, it is sufficient to note that a number of these methods involve measuring the capacitance between one or more electrodes on the puck and electrodes on surface 12. An exemplary puck electrode is shown at 21 in FIG. 1B.

While the meander springs shown at 13 provide the required restoring force, meander springs have several problems. The meander springs shown in FIGS. 1A–1B prevent the puck from reaching all portions of the puck field of motion. This is particularly true if the puck motion is toward the attachment point of the spring on the periphery of the puck field of motion. Hence, to provide a device with a specified area in the puck field of motion, a somewhat larger lateral area is needed to accommodate the unusable space on the surface that is required for the springs in their compressed state. In addition, the force required for moving the puck is different for different areas of the puck field of motion and different directions of motion. Common helical coiled springs have similar problems. In addition, the springs have a significant thickness, which increases the thickness of the pointing device. The device thickness can be a problem in many applications in which space is at a premium. Other solutions, such as elastic membranes, or radial segments of rubber suffer from non-linearity of the force response and thereby exert excessive force on the user near the perimeter.

Figure 2:
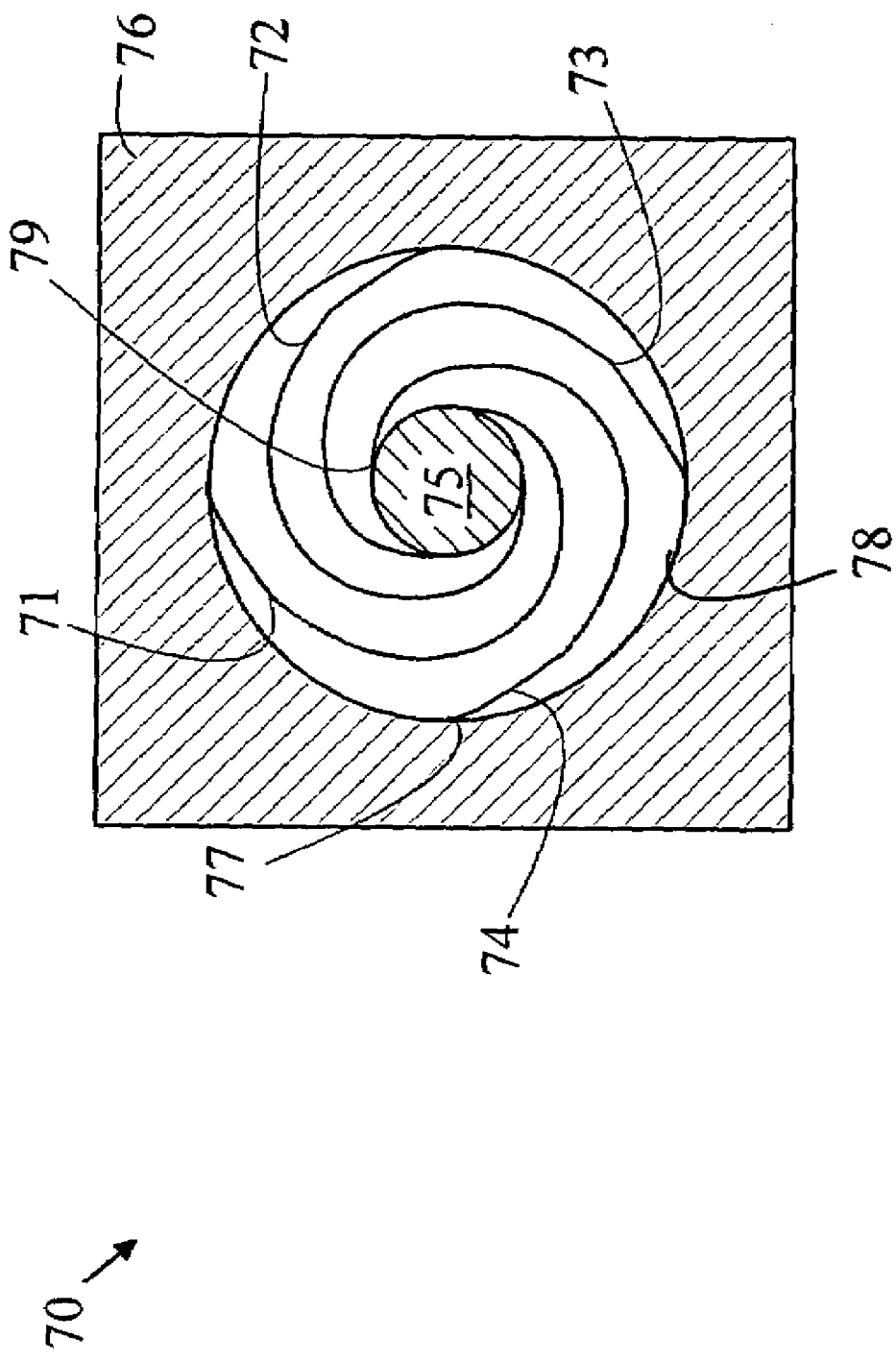
FIG. 2 is a top view of a pointing device 70 that utilizes a suspension system according to one embodiment of the present invention.

Refer now to FIG. 2, which is a top view of a pointing device 70 that utilizes a suspension system according to one embodiment of the present invention. Pointing device 70 uses a spiral spring design that more nearly provides the ideal characteristics discussed above. Puck 75 is attached to four spiral springs shown at 71–74. Each spiral member has one end attached to puck 75 and the other end attached to the fixed portion of the pointing device at a point on the boundary 78 of the puck field of motion that is defined by the opening in plate 76. A typical attachment point is shown at 77.

The optimal spring is a spiral that turns through approximately 270–360 degrees. That is, a spring connected to the top of the puck at 12 o'clock as shown at 79 ends between 9 o'clock and 12 o'clock on the boundary of the puck field of motion as shown at 77. While this is the preferred spring configuration, other spring configurations can be utilized. If shorter springs are used, the puck tends to rotate as it moves to the extremities of the puck field of motion. Such rotations can interfere with the position sensing mechanism in some designs. Springs longer than 360 degrees consume more of the available space and result in softer restoring forces.

The puck design shown in FIG. 2 has a dead space adjacent to the boundary of the puck field of motion that is three times the width of a spring. Metal springs that are approximately 0.25 mm in width perform adequately. Hence, an area that is less than 1 mm wide adjacent to the boundary of the puck field of motion is all that is wasted in such spiral spring based pointing devices. Plastic springs 0.75 mm wide and 1.5 mm thick are adequate for a puck that is 30 mm in diameter in a 60 mm diameter field of motion.

The embodiment shown in FIG. 2 utilizes a planar spiral member for each of the springs. That is, the curve executed by the spring when the puck is centered in the puck field of motion is given by $R=k-k'\theta$, in a polar coordinate system (R, $\theta$). Here, k and k' are constants. While this curve is a good approximation for most of the spring's length, a curve that differs from this relationship at the two ends is advantageous. In such a spring, the two ends of the spiral are modified to make the ends nearly tangential [adjectival form] to the points at which the spring attaches to the puck and the boundary of the puck field of motion. This modification allows the puck to more easily reach the extremities of the puck field of motion. In addition, it will be appreciated that the exact curve executed by each planar spiral member can differ somewhat from a perfect spiral and still provide substantial benefits over other spring designs. Accordingly, the term "planar spiral member" will be defined to include any linear structure having a length L and a centerline that executes a curve in a polar coordinate system (R, $\theta$) such that for any given value of $\theta$, R is within 25% percent of $R_0=k-k'\theta$ for at least 50% percent of L. In addition, other forms of arcuate springs can be utilized; although such springs do not provide all of the advantages of the spiral members discussed above.

The above-described embodiments of the present invention utilize four springs for restoring the puck to its resting position. However, other numbers of springs can be utilized. In principle, one spring could be used; however, the spring would need to provide the return force in two directions, and hence, would no longer be isotropic, and would be much stiffer than the springs described above. In addition, more springs can be used to provide additional electrical connections to the puck.

The springs in the above-described embodiments ideally return the puck to a resting position that is in the center of the field of motion. Such embodiments maximize the amount of motion that can be accommodated from the resting position. However, it will be apparent from the preceding discussion that the puck need not be returned exactly to the same starting position each time it is released. Similarly, the puck need not return to a resting position that is exactly in the center of the puck field of motion. So long as the puck returns to a position that is near enough to the center of the puck field of motion to allow the puck to be moved from that position to a new position in some desired direction, the present invention will provide an improvement over the meander spring design discussed above.

In an embodiment, the puck includes some form of oscillation damping to ensure that the puck will return to its resting position with as few oscillations as possible. One method for damping oscillations is to assure that the puck remains pressed against the underlying surface as it returns to its resting position when released by the user. In this case, friction between the puck and underlying surface provides the damping force. This can be accomplished by mounting the springs such that the springs apply a downward force on the puck. For example, the attachment point for the end of the spring on the puck can be located at a greater distance from the underlying surface than the attachment point for the other end of the spring. Alternatively, the springs can be deformed so that each spring exerts a downward force in addition to the restoring forces described above.

Figure 5:
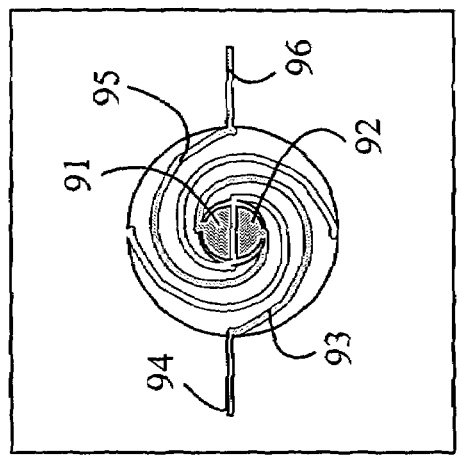
FIGS. 3–5 illustrate the construction of a puck, springs, and puck field of motion boundary according to one embodiment of the present invention at various stages in the fabrication process.
Figure 4:
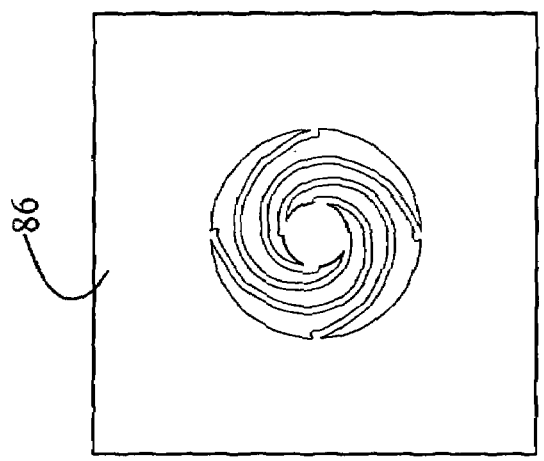
Figure 3:
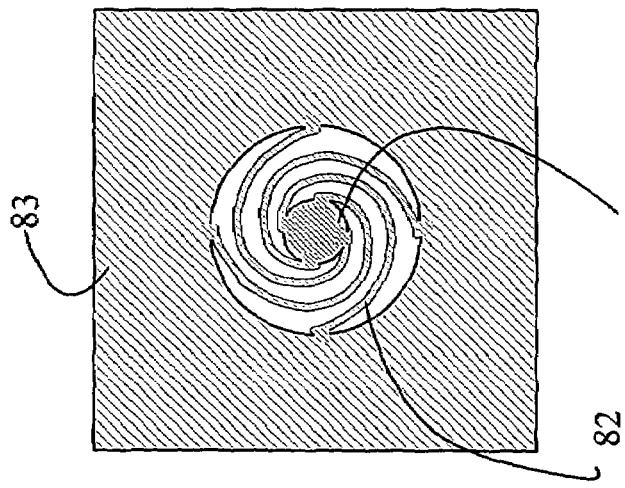

The present invention is also simple and economical to fabricate. The puck and springs can be formed from a sheet of material of the type used for the springs by stamping or etching the sheet to generate the puck and springs attached to a border that provides the boundary of the puck field of motion. For example, conventional photolithography techniques can be used to etch a sheet of plastic to form a plastic puck and plastic springs attached to the edges of the sheet. Refer now to FIGS. 3–5, which illustrate the construction of a puck, springs, and puck field of motion boundary according to one embodiment of the present invention at various stages in the fabrication process. The process starts by protecting the area of a sheet of plastic that will become the puck 81, springs 82, and boundary 83 with a photoresist pattern as shown in FIG. 3. The plastic is then etched to remove the unprotected portions of the plastic between the springs, and the photoresist removed to leave a single plastic structure 86 as shown in FIG. 4.

Refer now to FIG. 5. If the puck utilizes one or more electrodes on the surface of the puck as part of a position measuring scheme such as that discussed above, the electrodes can be deposited and patterned using conventional plating techniques or vacuum deposition such as sputtering. Exemplary electrodes are shown at 91 and 92 in FIG. 5. If electrical connections to the electrodes are required, one or more of the springs can also be plated with electrical conductors that connect the electrodes to the periphery of the puck field of motion. For example, electrode 91 is connected to lead 94 by plated spring 93. Similarly, electrode 92 is connected to lead 96 by plated spring 95.

The puck, springs and periphery can also be molded from plastic in a single step using techniques well known in the art. Conductors can also be embedded during the molding process, in addition to the plating, or vacuum deposition techniques discussed above.

While the above-described embodiments of the present invention have utilized a puck field of motion that is circular, the puck field of motion can have other shapes. For example, the puck field of motion could be elliptical or rectangular. In these cases, the optimal spring shapes will be different than those described above, but will still generally be arcuate springs.

The above-described embodiments of the present invention have utilized a puck as the moveable object. However, the present invention may be applied to other objects as well. Accordingly, the term "puck" as used herein includes any object that is to be returned to a fixed point in a field of motion.

Various modifications to the present invention will become apparent to those skilled in the art from the foregoing description and accompanying drawings. Accordingly, the present invention is to be limited solely by the scope of the following claims.

What is claimed is:

1. An apparatus comprising:
   a moveable puck;
   a boundary defining a puck field of motion in which said puck moves relative to said boundary;
   a first arcuate spring having a first end connected to said puck and a second end connected to said boundary;
   a second arcuate spring having a first end connected to said puck and a second end connected to said boundary, said first and second arcuate spring applying opposing forces to said puck that maintains said puck in a predetermined region of said puck field of motion when no external force is applied to said puck, wherein first and second arcuate springs comprise planar spiral members.

2. The apparatus of claim 1 wherein said first arcuate spring also applies a force that dampens any oscillations in said puck position when said puck returns to said predetermined region in said puck field of motion.

3. The apparatus of claim 1 wherein said puck further comprises an electrode and wherein one of said arcuate springs electrically connects said electrode to a point outside said puck field of motion.

4. The apparatus of claim 1 wherein said boundary comprises an opening in a layer of material.

5. The apparatus of claim 4 wherein said material comprises plastic.

6. The apparatus of claim 4 wherein said material comprises metal.

7. An apparatus comprising;
   a moveable puck;
   a boundary defining a puck field of motion in which said puck moves relative to said boundary;
   a first arcuate spring having a first end connected to said puck and a second end connected to said boundary, said arcuate spring applying a force to said puck that maintains said puck in a predetermined region of said puck field of motion when no external force is applied to said puck, wherein said boundary comprises an opening in a layer of material, and
   wherein said puck and said springs comprise a portion of said layer of material.

* * * * *